United States Patent
Runge

[11] Patent Number: 5,189,596
[45] Date of Patent: Feb. 23, 1993

[54] TRANSITION FOR ELECTRICAL APPARATUS

[75] Inventor: Louis L. Runge, Clinton, Miss.

[73] Assignee: Westinghouse Electric Corp., Pittsburgh, Pa.

[21] Appl. No.: 811,361

[22] Filed: Dec. 20, 1991

[51] Int. Cl.⁵ .................................. H02B 1/04
[52] U.S. Cl. .................. 361/355; 174/68.2; 439/814
[58] Field of Search .......... 174/68.2, 71 B, 72 B, 174/88 B, 129 B; 361/346, 353, 354, 355, 358, 361, 363, 376; 439/715, 716, 723, 724, 801, 805, 810, 814

[56] References Cited

U.S. PATENT DOCUMENTS

| | | | |
|---|---|---|---|
| 3,075,039 | 1/1963 | Kobryner | 174/99 B |
| 3,769,553 | 10/1973 | Coley | 317/119 |
| 4,167,769 | 9/1979 | Luke | 361/355 |
| 4,251,851 | 2/1981 | Diersing | 361/361 |
| 4,464,198 | 2/1987 | Rich | 361/346 |
| 4,667,268 | 5/1987 | Mrowka | 361/353 |
| 4,783,718 | 11/1988 | Raabe | 361/363 |
| 4,809,132 | 2/1989 | Palmieri | 361/353 |
| 4,821,144 | 4/1989 | Grass | 361/353 |
| 4,884,047 | 11/1989 | Baginski | 335/10 |
| 4,899,253 | 2/1990 | Buxton | 361/376 |
| 5,008,493 | 4/1991 | Wagener | 174/68.2 |

FOREIGN PATENT DOCUMENTS 3424482 1/1986 Fed. Rep. of Germany ...... 361/355

Primary Examiner—Gerald P. Tolin
Attorney, Agent, or Firm—M. J. Moran

[57] ABSTRACT

In an electrical transition a nonconductive base has at least one side rail and at least one interior rail spaced apart from a side rail and a wire connector fitted therebetween. The side rail and interior rail prevent the connector from moving across the base. A bus bar is placed on the base and has a tab extending into the opening of the connector.

5 Claims, 3 Drawing Sheets

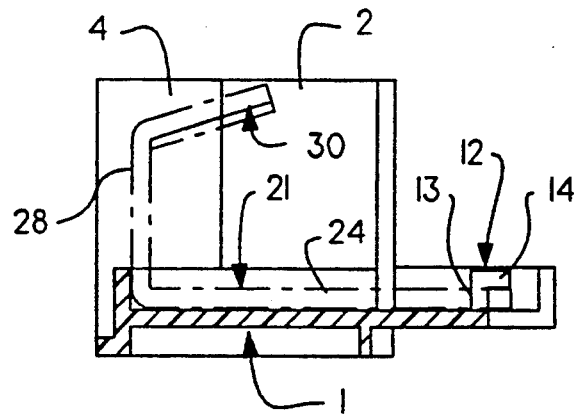
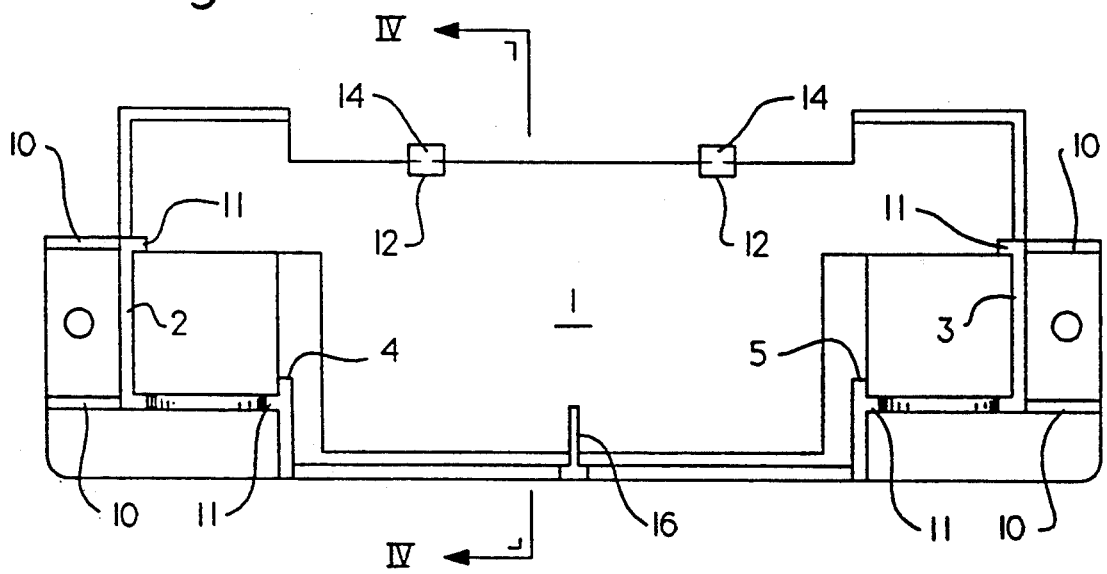
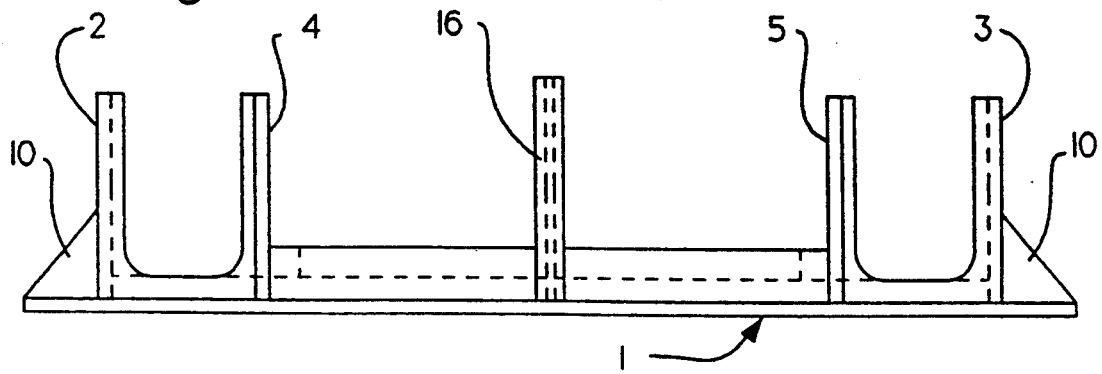

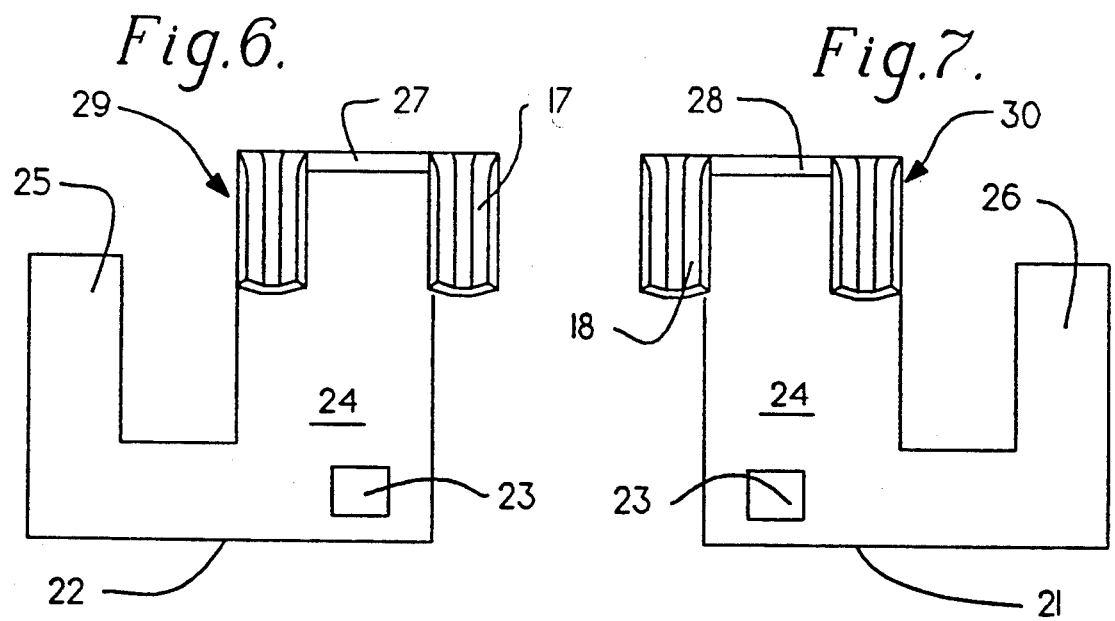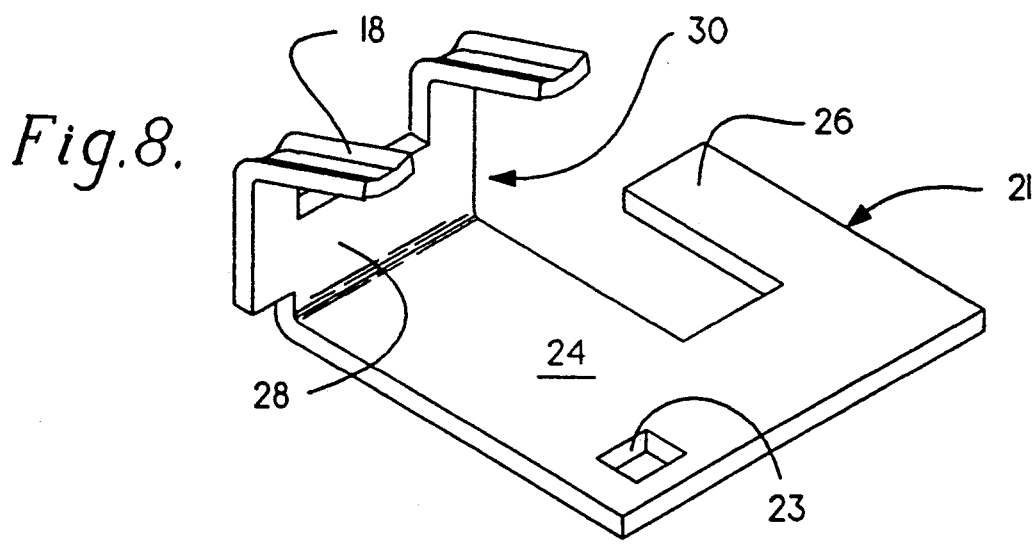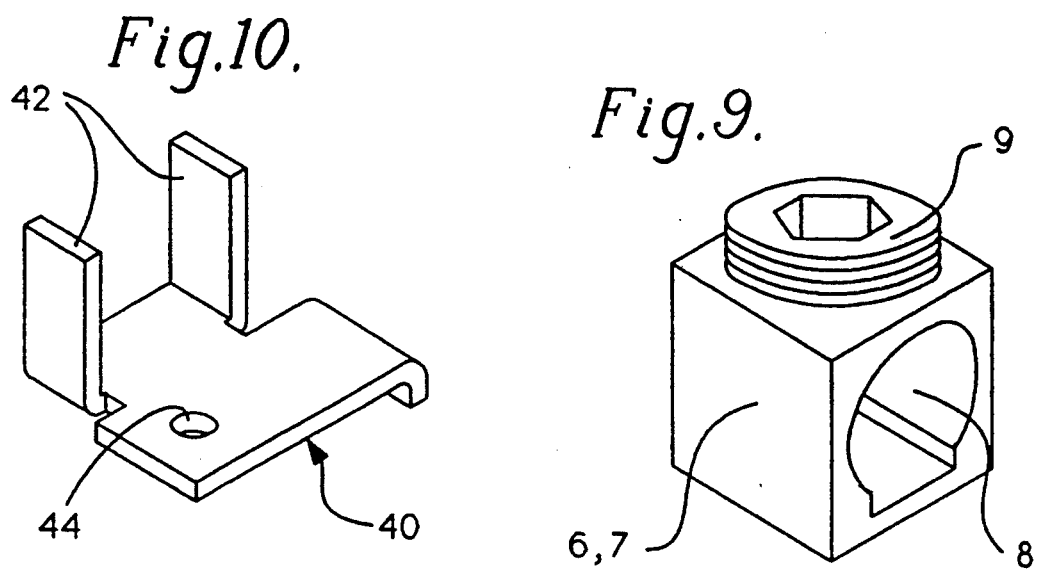

TRANSITION FOR ELECTRICAL APPARATUS

BACKGROUND OF THE INVENTION

1. Field of the Invention

The present invention relates to an improved electrical transition upon which circuit breakers and other components can be readily mounted.

2. Background Information

A transition is required in an electrical apparatus to provide a current path from one point to another. This is accomplished with an arrangement of components such as electrical wire connectors, bus bars, insulated cable, supports, and insulators. The assembly of such components is normally accomplished with mechanical fasteners such as screws, washers and nuts. Mechanical fasteners are costly to procure, store and assemble. Moreover, should any connection be improperly made, that error can reduce the efficiency of the transition. To assure that mechanical fasteners are properly tightened, the art has used costly power drivers to install such fasteners.

There is need for a transition which can be readily assembled without mechanical fasteners. The assembly should be of consistently high quality. Preferably, the components should snap together and be self-locating.

SUMMARY OF THE INVENTION

I provide an improved transition for electrical apparatus comprising a base made of non-conductive material onto which a bus bar base can be snap fit. Tabs are provided on the base which fit through holes in the bus base and retain the bus in place. The bus bar preferably has at least one upright segment attached to the bus base and a contact extending from the upright at an oblique angle to the upright segment. A circuit breaker or other component can be fitted within the contact and there secured by a set screw. I also prefer to provide a well at either end of the base into which a wire terminal can be placed. A tab extending from the bus bar fits within each terminal to hold the terminal within the well and prevent transverse movement of the bus bar.

Other objects and advantages of the invention will become apparent as a description of the present preferred embodiment proceeds.

DESCRIPTION OF THE DRAWINGS

FIG. 3 is a top plan view of the base used in the transition of the previous figures.

FIG. 4 is a sectional view of the base taken along the lines IV—IV of FIG. 3 with a bus bar shown in chain line positioned thereon.

FIG. 5 is a front view of the base.

FIG. 6 is a top plan view of the present preferred bus bar.

FIG. 7 is a top plan view of a second present preferred bus bar.

FIG. 8 is a perspective view of the embodiment of FIG. 7.

FIG. 9 is a perspective view of a present preferred connector.

FIG. 10 is a present preferred stab-type connector for use in the embodiment of FIG. 1.

DESCRIPTION OF THE PREFERRED EMBODIMENTS

Figure 2:
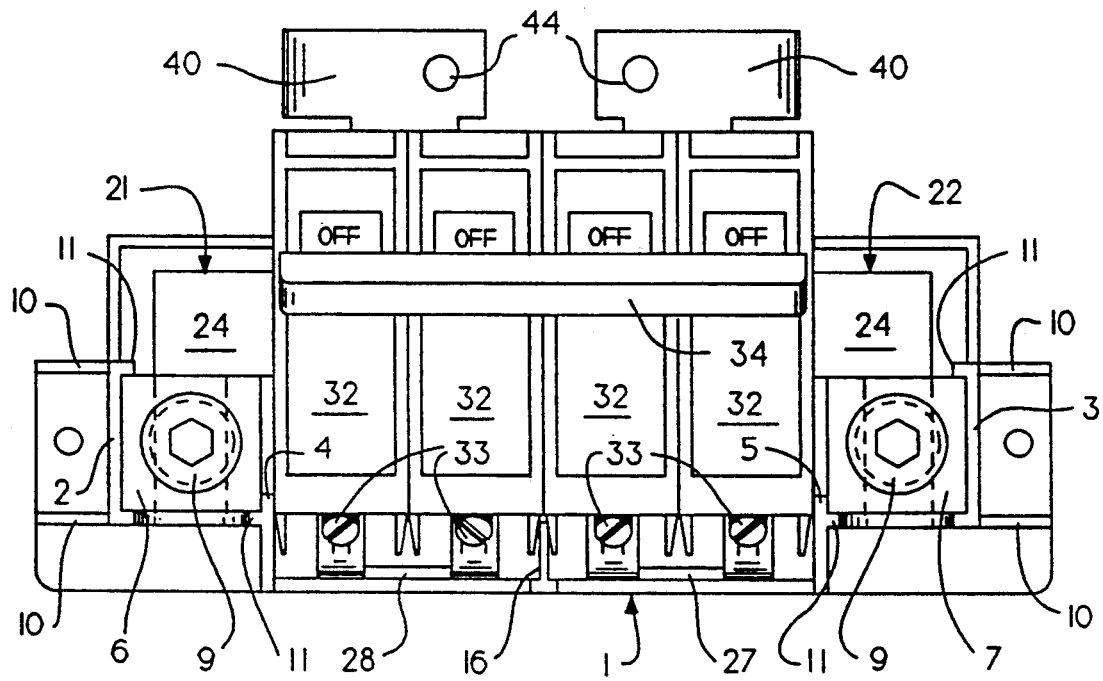
FIG. 2 is a top view of the embodiment of FIG. 1.
Figure 1:
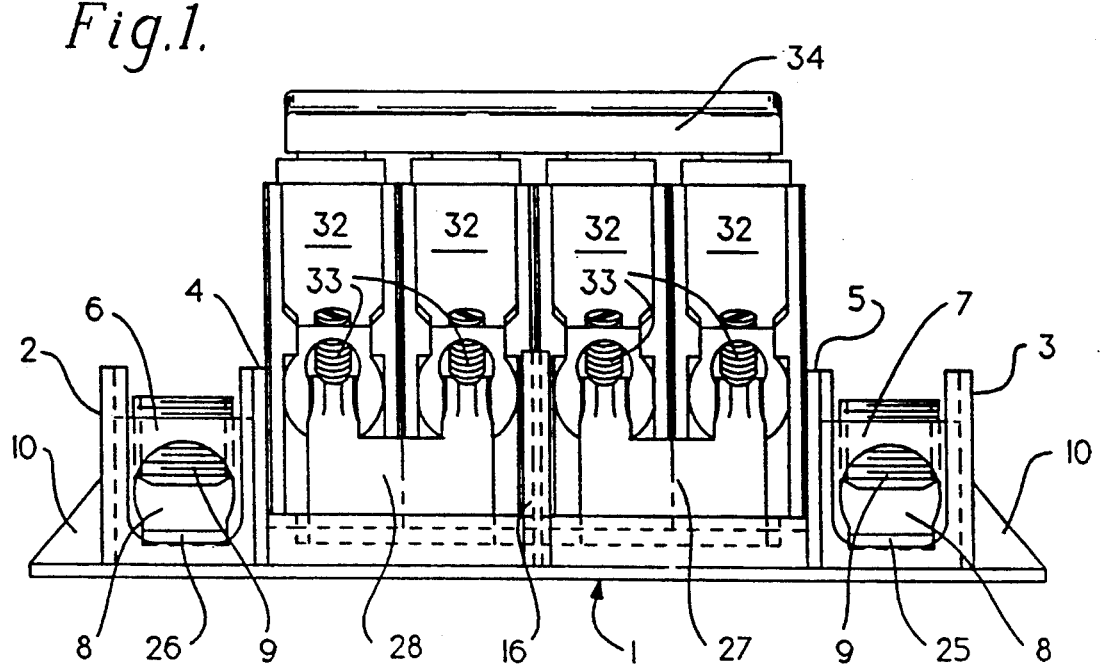
FIG. 1 is front view of the present preferred transition with attached bus bar and terminals having four circuit breakers attached thereto.

Referring to FIGS. 1 and 2, I provide an improved transition having a base 1 made of non-conductive material. On either side of the base I provide upstanding side rails 2 and 3. I also provide interior rails 4 and 5 which are parallel to the side rails. I prefer to provide gussets 10 to support side rails 2 and 3. The base, side rails, interior rails and gussets are preferably integrally molded as a single unit. A generally cubicle wire connector 6 or 7 is fit between rails 2 and 4 and rails 3 and 5. These wire connectors have an opening 8 into which a cable may fit. Set screw 9 can be tightened to secure a cable within opening 8. Tabs 11 extend inwardly from side rails 2 and 3 and outwardly from interior rails 4 and 5. These tabs 11 are positioned so that terminal connectors 6 and 7 are held on base 1 and prevented from rotation. Bus bars 21 and 22 are placed on the base 1. As shown in FIGS. 5 and 6, a hole 23 is provided in the bus base 24 of each bus bar. When the bus bar is placed on the base 1 as shown in FIG. 4, a tab 12 extends through hole 23 in bus bar 21 or 22 to secure the bus bar against the base 1. Tab 12 has a vertical portion 13 and a horizontal portion 14. To attach a bus bar to the base one fits tab portion 14 through the hole 23 in the bus bar and then slides the bus bar forward. Then, horizontal tab portion 14 will overlay the bus base 24 and prevent the bus base 24 from being lifted away from the base. Bus base 24 has a tab portion 25 or 26. This tab portion extends through opening 8 in connector 6 or 7. Because these tabs are within the opening 8, the connectors cannot be lifted away from the base 1. As previously mentioned, the side rails 2 and 3, interior rails 4 and 5 and the tabs 11 extending therefrom prevent connectors 6 and 7 from moving across the base 1. Thus, when screws 9 are tightened the bus bars 21 and 22 cannot be slid across the base. Hence, the horizontal portion 14 of tab 12 will continue to overlay the bus bar base thereby preventing the bus bars 21 and 22 and connectors 6 and 7 from being lifted from the base 1.

Unlike the prior art, no heel is required to maintain the circuit breaker in place. As can be seen from FIGS. 1, 4, 6, 7 and 8, the bus bars contain a contact 29 and 30 each having, an upright segment 28 or 27 extending from the bus bar 24. The contacts 29 and 30 are preferably shaped to provide an oblique angle relative to the upright portions 27, 28. As can be seen in FIG. 1, each contact 29, 30 fits into an opening in circuit breaker 32 and is secured in place by a set screw 33. I prefer to provide a central vertical rail 16 which extends upwardly from base 1, to align the circuit breakers 32. Large cables, such as 200 amp cables, cannot be connected directly to the circuit breaker through set screws 33. However, such large cables can easily be attached to connectors 6 and 7. Thus, an electrical connection can be established from a large cable (not shown) attached to a connector 6 or 7 through the bus bar 21 or 22 to the circuit breaker 32. Accordingly, current flows through any transition can be as high as 200 amps.

Another advantage of the present transition is that several single pole circuit breakers can be attached to the bus bar. Because these circuit breakers are positioned side by side, one handle 34 can be provided to operate two or more circuit breakers. In the present preferred embodiment one handle 34, shown in FIG. 1, operates four circuit breakers 32.

The type of circuit breakers shown in FIGS. 1 and 2 also have at least one slot (not shown) to receive a stab connector. Accordingly, I provide a stab-type connector 40 shown in FIG. 10. The connector 40 has two upright stabs 42 which engage slots in the circuit breakers 32. The connector 40 preferably has a hole 44 into which one can place a fastener for securing the connector 40 to a bus bar, terminal bar, neutral bar or other connector.

Although I have shown circuit breakers 32 attached to the bus bars 21 and 22, my transition could also be used with other electrical components. For example, one could clamp a wire connector to the bus bar.

The embodiment shown in the drawings utilizes two bus bars 21 and 22. If desired, these bus bars could be combined in a single unit. Additionally, one could provide additional uprights and clamp portions in a bus bar to receive additional circuit breakers or other components.

Although I have shown and described a present preferred embodiment of the invention, it is to be distinctly understood that the invention is not limited thereto, but may be variously embodied within the scope of the following claims.

I claim:
1. An electrical transition comprising:
   a) a nonconductive base having extending upwardly therefrom
      i) at least one side rail; and
      ii) at least one interior rail spaced apart from a side rail so that a wire connector may fit therebetween, the side rail and interior rail being sized and configured to prevent a connector placed therebetween from moving across the base;
   b) at least one connector, each connector positioned between a side rail and an interior rail, and having an opening therein; and
   c) a bus bar placed on the base, the bus bar having a bus base, at least one tab extending into the opening of one connector, and at least one contact having an upright portion extending upwardly from the base, and an angled portion attached to the upright portion and extending over the bus base, the contact being sized and configured to receive a circuit breaker.

2. The transition of claim 1 wherein the angled portion of the contact is attached to the upright portion at an oblique angle.

3. The transition of claim 1 wherein the at least one connector is cube-draped.

4. The transition of claim 1 also comprising at least one hook attached to the non-conductive base and wherein the bus bar has an aperture through which the hook passes.

5. The transition of claim 4 wherein the at least one hook has a vertical portion which extends through the aperture and a horizontal portion which overlays the bus bar.

* * * * *